Sept. 8, 1925.
O. A. ANDERSON
GEAR SHIFT LEVER
Original Filed April 25, 1921
1,552,412
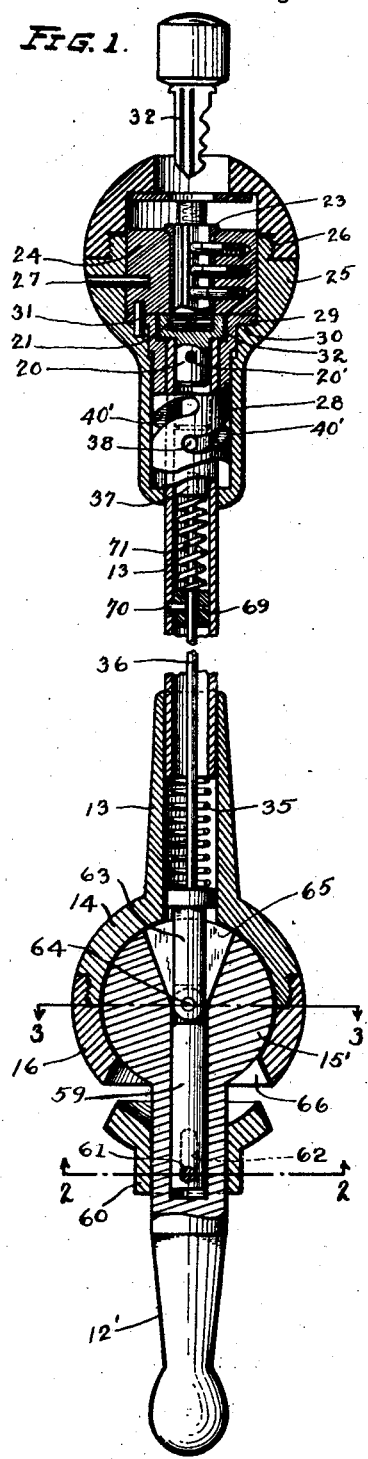
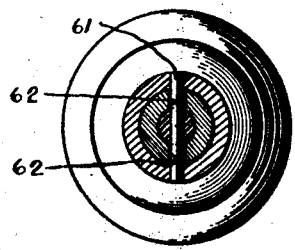
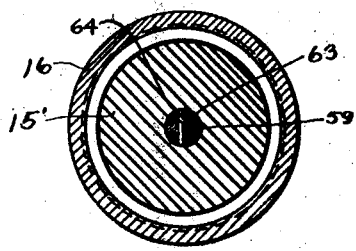
Inventor
O. A. ANDERSON.

Patented Sept. 8, 1925.

1,552,412

UNITED STATES PATENT OFFICE.

OLAF A. ANDERSON, OF HAMILTON, OHIO.

GEAR-SHIFT LEVER.

Original application filed April 25, 1921, Serial 464,121. Divided and this application filed June 21, 1922. Serial No. 569,781. Renewed June 11, 1925.

*To all whom it may concern:*

Be it known that I, OLAF A. ANDERSON, a citizen of the United States, and a resident of Hamilton, county of Butler, State of Ohio, have invented certain new and useful Improvements in Gear-Shift Levers, of which the following is a specification.

This invention relates to locking devices for motor vehicles and more particularly to devices for rendering the usual gear-shift lever of a motor vehicle inoperative.

One of the objects of the invention is to provide a device of the type referred to by which the gear-shift lever may be rendered inoperative in any of its positions and without regard to whether the gears are in mesh or in neutral. A further object of the invention is to provide a locking device which will render the gear-shift lever ineffective to shift the gears although permitting the lever to be moved freely in any direction.

Other objects of the invention and the features of novelty will be apparent from the following description taken in connection with accompanying drawings, of which:

Figure 1 is a longitudinal section through a lever embodying my invention;

Fig. 2 is a transverse section on the line 2—2 of Fig. 1; and

Fig. 3 is a section on the line 3—3 of Fig. 1.

This application is a division of my application No. 464,121, filed April 25, 1921.

The form of the invention illustrated comprises a lever formed in two sections, the section 12' representing the gear-shifting section and the section 13 the handle. These two sections are secured together by a ball and socket joint which consists of the ball 15' on the section 12' and the socket in the part 14 on the section 13. As will be noted from the drawings the part 14 has a spherical exterior and is thus adapted for universal movement in a suitable socket in the transmission casing of the vehicle.

The sections 12' and 13 are provided with aligned openings on opposite sides of the ball and socket joint connecting the sections and in these openings the plungers 59 and 63 are arranged. These plungers are hinged together, as indicated at 64, and a spring 35 bears on the top of the plunger 63 and tends to force the parts downwardly, as will be readily understood from the drawings. The plunger 59 is connected with a member 60, slidable on the section 12', by means of a cross pin 61 which extends through suitable slots 62 in the section 12' and permit the member 60 to be raised and lowered.

The ball 15' is retained in the socket in the part 14 by means of the member 16, having an opening 66 through which the section 12' projects and which is adapted to receive the flange at the top of the member 60 to rigidly connect the sections together and prevent relative swinging movement therebetween.

The ball 15' has a fan-shaped slot 65 which permits the swinging movement of the section 12' when the axis of the pivot 64 is at the center of the ball 15', but it will be noted that the construction is such as to limit the relative movement of the lever sections to a single plane at right angles to the axis of the pivot 64.

Arranged on the upper end of the section 13 is a rotatable knob 25. There is also secured in the upper end of the section 13, by a pin 20', or in any other suitable manner, a plug or adapter 20 which, in turn, has rigidly secured to it, as by the threads 21 and pin 22, the barrel 23 of a pin lock. The cylinder 24 of this lock is housed in an opening in the knob 25, this knob being formed of two sections which are screwed together at 26. The cylinder 24 and the knob 25 are secured together against relative rotation by the pin 27. A sleeve 28 has a flange 29 arranged between the bottom of the cylinder 24 and a shoulder 30 in the knob and is held against rotation relative to the knob by a pin 31. The lock, comprising the barrel 23 and the cylinder 24, therefore, serves to secure the knob 25 against rotation on the handle 13 when the key 32 is removed from the barrel 23, according to the well-known principle of the pin lock illustrated.

A rod 36 is attached to the plunger 63 and, at its upper end, to the block 37 that is slidable in the upper end of the section 13 of the lever and carries a cross pin 38, the opposite ends of which project through elongated slots in the section 13 and into the spiral slots 40' in the sleeve 28. Thus when the knob 25 is rotated in the left hand direction, the parts being as shown in Fig. 1, the ends of the cross pin 38 will traverse the spiral slots 40' and thereby lift the block 37 as well as the plungers 59 and 63 until the latter enters the opening 66 and locks the lever sections rigidly together. When the knob 25 is rotated in the opposite direction the member 60 will be withdrawn from the opening 66 and permit one section of the lever to be swung relatively to the other. A spring 71 arranged between the block 37 and a plug 69, secured in the section 13 by the pin 70, normally tends to lift the block 37 and thus tends to move the member 60 into the opening 66.

When the key 32 is removed from the lock the knob 25 is secured against rotation and the parts are so arranged that the key may be removed only when the member 60 is out of the opening 66 thereby permitting relative movement of the lever sections and preventing the use of the lever for shifting gears. By inserting the key in the lock and rotating the knob 25 the member 60 is caused to enter the opening 66, thereby locking the lever sections together and causing them to act as a unit.

Having thus described my invention, what I claim is:

1. In a device of the class described, the combination with a lever comprising a plurality of sections connected by a ball and socket joint, the socket of one section having a relatively large opening through which the other section projects and which permits relative movement between the sections, of a member slidable on said other section into said opening and adapted to prevent relative movement between the sections, and means comprising a plurality of parts hinged together and slidably arranged in said sections and connected with said member for actuating the latter.

2. In a device of the class described, the combination of a lever comprising two sections hinged together, a member slidable on one of said sections into engagement with the other to so connect the sections that they will act as a unit, and a plurality of jointed members slidably arranged in said sections and operatively connected with the first-mentioned member, the joint between said plurality of members being arranged to coincide with the axis of hinge between said lever sections when the first-mentioned member is in position to permit relative movement between said lever sections.

3. In a device of the class described, the combination of a lever comprising two sections hinged together, means for preventing relative movement between said sections, and a plurality of members pivotally connected together and operatively connected with said means to actuate the latter, the pivot between said members being arranged to coincide with the axis of the hinge between said lever sections when said means is positioned to permit relative movement between said lever sections.

In testimony whereof I affix my signature.

OLAF A. ANDERSON.